United States Patent Office 3,231,554
Patented Jan. 25, 1966

3,231,554
VINYL ETHER POLYMERIZATION PROCESS
USING AN ALKYLALUMINUM DIHALIDE
Roland J. Kern, Hazelwood, Mo., assignor to Monsanto
Company, a corporation of Delaware
No Drawing. Filed June 14, 1962, Ser. No. 202,375
8 Claims. (Cl. 260—91.1)

This invention relates to a process for the polymerization of vinyl ethers to prepare solid polymers of high molecular weight. The process of this invention can be used to synthesize polymers characterized by a stereospecific arrangement of the side chain substituents along the carbon-carbon polymer "backbone."

This invention relates to the polymerization of vinyl ethers to form solid polymers of high molecular weight by the use of alkylaluminum halide catalysts containing fluoride as at least part of the halide content of said catalysts.

An object of this invention is to prepare crystalline polymers of vinyl ethers by the use of heterogenous catalysis.

The preparation of homopolymers of vinyl alkyl ethers has generally been carried out with the use of Friedel-Crafts catalysts or with acid-reacting condensing agents. Polymerization with these catalysts, however, gives only liquid products, unless a critical low temperature is maintained during the reaction. For example, U.S. 2,104,000 teaches the use of boron halides at a recommended temperature of between 40 and 60° C. Polyvinyl alkyl ethers prepared at these temperatures with an active catalyst, such as a boron halide, are exclusively viscous liquid products.

Vinyl isopropyl ether polymerizes explosively at 40° C. in the presence of a boron halide catalyst and sticky, viscous, balsam-like products are obtained; with the same monomer and catalyst the reaction proceeds with explosive violence even if the temperature is reduced to below —10° C.

When the polymerization process of U.S. 2,104,000 is used to prepare polyvinyl methyl ether at a temperature of about 10° C., and above, the polymer ranges from liquid to semi-solid.

The process of U.S. 2,799,669 teaches the polymerization of vinyl alkyl ethers using acid-reacting condensing agents as catalysts at temperatures preferably between —60 and —70° C. To prepare solid, form-stable polymers by the process taught in this patent, the polymerization must be conducted at these extremely low temperatures.

Generally the catalysts employed in the prior art to polymerize vinyl alkyl ethers can be classified as homogeneous, or soluble, polymerization catalysts, whereas the catalysts of the present invention are operative as heterogeneous, or insoluble, materials. In some instances they are employed in the form of highly swollen, transparent gels. It is well-recognized by those skilled in the art that the mechanisms of polymerization, and thus the properties of the polymer produced, depend on the physical nature of the catalyst, i.e., whether it is classified as homogeneous or heterogeneous.

I have discovered that the alkylaluminum fluorides and the alkylaluminum chlorofluorides, prepared as I have set forth herein, catalyze the polymerization of vinyl ethers at mild temperatures to solid, high molecular weight, crystalline polymers, having an appreciable stereospecific polymer content.

Although there are applications for the gummy, semisolid, polyvinyl alkyl ethers, such as adhesive compositions, there are also many applications for which these type materials are totally unsuitable. By the practice of my invention, polyvinyl ethers are prepared that can be used in the molding, pressure-casting and extrusion fields. Thus, I have prepared polymers that can be rolled or pressed into thin sheets for use in lamination work or for use as wrapper films, or for container coatings. These solid, crystalline products can be used as electrical insulators and they have applications as bases for pressure-sensitive surgical and transparent tapes. These polyvinyl ethers can be also blended with other polymers, for example, with polystyrene, polyethylene, polyvinyl chloride, etc. to prepare new compositions having the desirable properties of each constituent in said blend.

Vinyl ethers suitable as monomers for practicing my invention have the formula $CH_2=CHOR$, where R is an alkyl radical, haloalkyl radical or haloaryl radical. Examples of suitable monomers are vinyl methyl ether, vinyl ethyl ether, vinyl propyl ether, vinyl allyly ether, vinyl isopropyl ether, vinyl butyl ether, vinyl isobutyl ether, vinyl tert. butyl ether, vinyl pentyl ether, vinyl hexyl ether, vinyl cyclohexyl ether, vinyl heptyl ether, vinyl benzyl ether, vinyl octyl ether, vinyl 2-ethyl-hexyl ether, vinyl nonyl ether, vinyl decyl ether, vinyl dodecyl ether, vinyl tridecyl ether, and vinyl tetradecyl ether. When R in the general formula is a haloalkyl radical, the monomer can be vinyl $\beta$-chloroethyl ether, vinyl $\beta$-bromoethyl ether, vinyl $\beta$-iodoethyl ether, vinyl 2,2,2-trichloroethyl ether, vinyl 2,2,2-tribromoethyl ether, vinyl 2-chloropropyl ether, vinyl 3-chloropropyl ether, and when R is a haloaryl radical the monomer can be vinyl o-chlorophenyl ether, vinyl m-chlorophenyl ether, vinyl p-chlorophenyl ether, vinyl m-bromophenyl ether, vinyl 2,4-dichlorophenyl ether, vinyl 2,4,6-trichlorophenyl ether, vinyl pentachlorophenyl ether, or vinyl chlorotolyl ether.

Monomers suitable for the practice of my invention can be classified as vinyl alkyl ethers, vinyl haloalkyl ethers, or vinyl haloaryl ethers. These classes of monomers can be used to prepare homopolymers and can be used to prepare copolymers by charging two or more monomers to the polymerization reactor. I can employ vinyl alkyl ethers wherein the alkyl radical contains from 1 to 14 carbon atoms, also vinyl haloalkyl ethers wherein the haloalkyl group contains 1 to 10 carbon atoms and 1 to 3 halogen atoms, each of which has an atomic weight of at least 35, e.g., chlorine, bromine, or iodine, and also vinyl haloaryl ethers wherein the haloaryl group contains 6 to 10 carbon atoms and 1 to 5 halogen atoms having an atomic weight of at least 35, e.g., chlorine, bromine, or iodine.

The alkyl substituent in the monomer molecule can be either a straight chain radical or a highly branched radical. A suitable monomer can be prepared by the reaction of acetylene with methanol, ethanol, n-butanol, n-hexanol, n-dodecanol or n-tetradecanol as representative examples. Vinyl branched-chain ethers can be prepared by the reaction of acetylene with isopropanol, isobutanol, 2-ethyl hexanol, and 3,5,5-trimethyl nonanol, for example. Branched-chain alcohols prepared by the Oxo process from an olefin, carbon monoxide, and hydrogen can similarly be used to prepare suitable monomers for the practice of my invention, e.g., alcohols from nonene, propylene tetramer, triisobutylene, and diisobutylene, can be converted to the corresponding vinyl alkyl ether having a highly branched alkyl chain.

Catalysts effective in polymerizing vinyl ethers to crystalline, solid polymers, according to my invention, are prepared by the action of fluorinating agents upon alkylaluminum dihalides under anhydrous conditions. Thus, ethylaluminum dichloride can be converted to ethyl aluminum chlorofluoride, ethylaluminum difluoride, and mixtures of the two. Reaction of ethylaluminum dichloride in a halogenated solvent with a fluorinated compound, as herein defined, results in the precipitation of the active catalyst gel, whose formula depends upon the proportion of fluorinating material employed. Ethylaluminum dichloride has marked activity as a catalyst for the polymerization of vinyl ethers to amorphous polymers, but the fluorinated derivatives are useful in polymerization reactions where the corresponding dichloride has no application, i.e., in stereospecific polymeriziations of vinyl ethers to prepare stereospecific polymer.

If the fluorination of the alkylaluminum dichloride be conducted with inorganic fluorinating agents, e.g., hydrogen fluoride, boron trifluoride, both the alkyl group and the chloride ions are replaced by fluoride ions. To obtain catalysts suitable for the practice of my process I prefer to employ organic fluorine-containing compounds, such as ethylidene fluoride, vinylidene fluoride, benzotrifluoride, 1,1,2 - trichloro-2,2-difluoroethane, dichlorodifluoromethane, chlorotrifluoromethane, bromotrifluoromethane, fluoroform, hexafluoroethane, chlorofluorethane, and dichlorodifluoroethane. In general, any of the fluoro-substituted, organic compounds can be used, some requiring a longer time for reaction than others. I prefer to employ a fluorine-containing, organic compound which is free of olefinic unsaturation to avoid polymer contamination of my active catalyst material.

The catalyst useful in the instant process has the general formula R'AlXF, wherein R' is an alkyl radical, preferably free of olefinic unsaturation, having from 1 to 12 carbon atoms, and X is a halogen atom selected from the group consisting of fluorine, chlorine, bromine and iodine. Suitable catalysts include methylaluminum difluoride, ethylaluminum difluoride, ethylaluminum chlorofluoride, ethylaluminum bromofluoride, n-propylaluminum difluoride, isopropylaluminum chlorofluoride, n-butyl aluminum iodofluoride, isobutylaluminum difluoride, pentylaluminum chlorofluoride, hexylaluminum bromofluoride, octylaluminum difluoride, octylaluminum iodofluoride, decylaluminum bromofluoride, decylaluminum chlorofluoride, and dodecylaluminum difluoride.

In the reaction of the alkylaluminum dihalide with the organic fluorinating agent, the amount of fluorine introduced into the catalyst molecule depends upon the mole ratio of initial reactants. For example, if ethylaluminum dichloride is treated with excess ethylidene fluoride, the product produced is exclusively ethylaluminum difluoride; however, as the mole proportion of ethylidene fluoride is reduced, a mixture of ethylaluminum difluoride and ethylaluminum chlorofluoride is produced. Still further reduction of ethylidene fluoride results in the production of higher proportions of the ethylaluminum chlorofluoride. For optimum production of stereospecific polymer of vinyl ether, I prefer to convert all of the alkylaluminum dihalide to alkylaluminum difluoride.

The fluorination of alkylaluminum dihalide is conveniently conducted under anhydrous conditions in an inert organic solvent. Suitable solvents include the halogenated solvents such as methyl chloride, ethyl chloride, methylene chloride and chloroform. Hydrocarbon diluents, such as the alkanes can be employed, but they are not as desirable as a halogenated methane. Generally I prefer methylene chloride as the solvent. As fluorination proceeds the active catalyst product is precipitated from the inert solvent as a gel-like substance.

In one preferred method of preparing these catalysts, the organic, fluorine-containing compound is slowly added to a solution of alkylaluminum dihalide in a lower alkyl chloride, for example, methylene chloride, cooled to about 0° C. The catalyst material precipitates as formed and is so finely divided, absorptive, and of such high surface area that a gel results. The solvent, by-product chlorine containing compound, and the excess fluorine containing reactant, if used, can be evaporated under reduced pressure to obtain a dry, free-flowing, finely divided product, or the catalyst can be employed in a slurry form. For the practice of my invention it is not generally necessary to remove essentially all of the by-product chlorine-containing compound from the catalyst. The trace quantities that are absorbed upon the catalyst surface apparently have no seriously adverse effects on catalyst activity, although generally catalyst activity is changed by their removal. In one concept of the formula of the effective catalysts of my invention, I can attribute activity to the formation of material according to the equation $$RAlCl_2 + R'F \rightarrow RR'AlCl_2F$$

wherein the fluorinated product is at least partially ionic due to the complex formed from R'F, or by bonding with R'Cl, a fluorination reaction by-product.

As an alternate method, the gel-like material, as previously described, can be added to an inert, saturated, aliphatic hydrocarbon diluent. The alkyl halide, by-product chloride, and excess fluorine-containing reactant can then be volatilized from the diluent, whereupon the catalyst is obtained as an extremely finely-divided dispersion in the hydrocarbon diluent. The catalyst prepared by this method is so finely-divided that the dispersion appears turbid and the catalyst settles out very slowly.

For convenience in isolating and purifying the polymers produced by my process, it is desirable to conduct the polymerization in the presence of a low concentration of catalyst. However, the catalyst concentration must be balanced against reaction time to avoid excessive time cycles. I can employ a catalyst concentration ranging from 0.05 to about 10 millimoles (mmoles) per liter of reaction mixture, and 0.1 to about 1 mmole is suitable for most purposes. It will be understood that the operable and optimum concentrations vary with the polymerization temperature and with the concentration of monomer in diluent, but selection of catalyst concentration is readily determined by those skilled in the art.

In practicing my invention I have found that inert diluents can be used, if desired, in the polymerization of the various vinyl ethers. The diluent has some utility in controlling the rate and temperature of reaction and it tends to prevent the deposition of solid polymer upon the stirring apparatus and walls of the reactor. This inert diluent is then useful in separating the desired polymer from the catalyst during the product isolation step. Saturated aliphatic hydrocarbons, for example, hexane, octane, nonane, decane, etc., aromatic compounds, e.g., benzene, toluene, xylene, and chlorinated hydrocarbons, such as methylene chloride and chloroform, can be used as inert diluents.

The practice of my invention is not limited to intermittent or batch-type operation, but is adaptable to continuous procedures as well. The catalyst described herein can be deposited on an inert carrier, e.g., alumina, carbon, silica or asbestos or mixtures thereof and the vinyl ether passed over the catalyst. If desired, the catalyst suspended in an inert diluent can be fed concomitantly with the monomer into the polymerization chamber. Other aspects of continuous operation will be obvious to those skilled in the art. For example, since one form of preferred catalyst is a fine powder that flows like liquid, the polymerization reactor can be modified so that catalyst and monomer can be fed concomitantly into the reactor containing an inert hydrocarbon liquid as diluent.

A particular advantage of my invention is that the process of polymerization does not depend upon a critical narrow range of temperature for operability. I prefer to carry out the reaction at a temperature from about −60° to about 100° C., preferably from about −40 to about 50° C. Operation at about room temperature provides convenience in controlling the reaction rate. Previous investigators have shown the polymerization to be somewhat unpredictable and runaway reactions were commonplace. By the use of my invention the polymerization is easily controllable at temperatures that are readily obtainable.

Polymerization is maintained at a desirable and economical rate by removing the heat of reaction and by adjusting the flow of monomer and catalyst to the reactor.

The polymers prepared by my invention have characteristic properties not possessed by the polyvinyl ether polymers of the prior art. My polymer products have a high degree of crystallinity when prepared and, furthermore, my polymers give a crystalline X-ray diffraction pattern when examined as fiber or film, without prior orientation as, for example, by stretching. The polymers can be characterized by their steric structure involving the spacial arrangement of the groups attached to the polymeric chain through the ether linkages. Polymers prepared by my process have a stereospecific arrangement of these side groups. The degree of stereospecificity possessed by the polymers varies with the method of catalyst preparation, the nature of the diluent or solvent employed for the polymerization, and the temperature of polymerization. The effects of these process variables will be better understood by reviewing the examples described herein.

In order to illustrate some of the various aspects of the invention and to serve as a guide in the application of this invention, the following specific examples are given. It will, of course, be understood that variations from the particular temperatures, pressures, diluents and proportions can be made without departing from the invention.

*Example 1*

This example illustrates the preparation of ethylaluminum dichloride by the reaction of ethylaluminum dichloride with ethylidene fluoride. A glass reactor fitted with a magnetic stirring device and topped with a condenser cooled by Dry-Ice was charged with 25 ml. methylene chloride, and 5 ml. of ethylauminum dichloride dissolved in 45 ml. anhydrous hexane. Ethylidene fluoride, condensed to a liquid at −45° C., 1 ml. was added to the reactor and the cooling bath which had been used to maintain the reactants at −30° C. was removed. The reactants slowly warmed up to room temperature and the solution turned from colorless to yellow as a gel began to form. After 2 hours reaction time the temperature had reached 25° C. and gel formation appeared to be complete. During the reaction period the gel gradually became purple in color. The slurry of gel and diluent was protected from moisture during its storage at room temperature, prior to use as a polymerization catalyst.

*Example 2*

A polymerization reactor equipped with a motor-driven stirrer was thoroughly dried and fiitted with a rubber grommet for charging the catalyst slurry by means of a hypodermic syringe which pierced this grommet. The reactor was charged with 225 ml. anhydrous hexane which had been passed through a column packed with molecular sieves just prior to use. An addition of 25 ml. freshly distilled methylene chloride was made followed by 50 ml. vinyl isobutyl ether which had been washed with ice water, dried over calcium chloride and then fractionated. The monomer solution was cooled to −40° C. and 2 ml. of the catalyst slurry of Example 1 added by means of the hypodermic syringe. Within 5 minutes the temperature had climbed to −20° C. and was maintained at this temperature. Within 30 minutes the reaction mixture had become very thick and granular, due to the presence of polymer. After a total reaction time of one hour the catalyst was quenched by the addition of excess pyridine and then methanol was added to precipitate the polymer. The polymeric product was extracted wtih boiling methanol and then dried in a vacuum oven at room temperature to obtain 38 g. of polyvinyl isobutyl ether having a specific viscosity of 0.07 for a 0.1% solution in chloroform at 25° C.

*Example 3*

In this run the charge and procedure of Example 2 was used except that the catalyst of Example 1 was aged for 7 days at room temperature before use. The initial injection of 1 ml. of catalyst slurry was made to the monomer solution maintained at −30° C. After 90 minutes at −30° C. the reaction mixture had become viscous due to the presence of granular-appearing polymer. After a total reaction period of two hours the catalyst was quenched with pyridine and the polymer precipitated by the addition of excess methanol. The product was filtered and obtained as a white granular product which was extracted four times with boiling methanol and dried in a vacuum oven at 40° C. to obtain 25.0 g. of polymer having a specific viscosity of 0.093, measured for a 0.1% solution in chloroform at 25° C.

*Example 4*

The 500 ml. reaction flask was charged with 200 ml. distilled methylene chloride and 50 ml. vinyl 2-chloroethyl ether which had been water-washed, dried and distilled over calcium hydride. This monomer solution was cooled to −40° C. and 4 ml. of the catalyst slurry described in Example 1 added in small increments over two hours and 15 minutes as the polymerization temperature was maintained in the range −40 to −14° C. After a total reaction period of three hours the catalyst was quenched by the addition of 2 ml. pyridine and the polymer precipitated by the addition of methanol. The polymer was permitted to stand under excess methanol for 48 hours and, after filtration, was extracted three times with boiling methanol. The dried, white solid polymer weighed 19.7 g.

*Example 5*

This run illustrates the stability of my catalyst under aging conditions. The polymerization reactor was charged with 225 ml. anhydrous hexane that had been passed through a column packed with molecular sieves just prior to using, and 25 ml. freshly distilled methylene chloride. To this solvent mixture was added 50 ml. vinyl isobutyl ether, which had been washed and distilled over calcium hydride. The reactants were cooled to −40° C. and 1 ml. of the catalyst slurry of Example 1 added at this temperature. The catalyst slurry had been stored under anhydrous conditions for 19 days at room temperature prior to using. During the reaction period of 110 minutes at −40° C. the reaction progressed at a normal rate so that the mixture became thick and granular as the polymer formed. The catalyst was quenched with 2 ml. of pyridine and the polymer fully precipitated by the addition of excess methanol. The product polymer was filtered and extracted once with hot methanol and two times with boiling acetone and then dried for 16 hours in the vacuum oven at 40° C. to obtain 26.5 g. of high molecular weight polymer further characterized by exhibiting a high percentage of polymer insoluble in methyl ethyl ketone, a high level of crystallinity as indicated by X-ray diffraction measurements of the polymer in an unstretched or unoriented condition, and a specific viscosity of 0.142 for a 0.1% solution in chloroform at 25° C.

*Example 6*

A dry, nitrogen-purged, glass polymerization reactor fitted with mechanical stirrer was charged with 120 ml. anhydrous hexane, 80 ml. distilled methylene chloride and 50 ml. vinyl methyl ether. The solution was cooled to −20° C. and 1 ml. of catalyst slurry as prepared in Example 1 was added. After a one hour reaction period, the formation of polymer as a gel was readily visible, and an additional 1 ml. of catalyst slurry was charged. After 1.75 hour the reaction mixture was very viscous and granular in appearance and mixing was continued for an additional 2.5 hours at −20° C. The catalyst was quenched with pyridine and the polymer precipitated by the addition of excess hexane. The polymer was permitted to stand in hexane for 24 hours and then vigorously mixed in a Waring Blendor with fresh hexane. The polymer was filtered and dried in a vacuum oven at 40° C. to obtain 32.0 g. of very light-colored granules having a specific viscosity of 0.192 for a 0.1% solution in chloroform at 25° C. The polymer obtained in this run gave a crystalline X-ray diffraction pattern and contained a high proportion of isotactic polymer as indicated by infrared examination and by its high percentage of polymer insoluble in methyl ethyl ketone and acetone.

*Example 7*

A dry, glass reactor, fitted with a Dry-Ice reflux condenser was charged with 20 ml. distilled methylene chloride and 1 ml. ethyl-aluminum dichloride and this solution cooled in a Dry-Ice bath. By means of the Dry-Ice condenser 60 drops of dichloro difluoromethane were added to the reactor, the cooling bath removed and the mixture permitted to warm up to refluxing temperature. After about 1.5 hours the solution had changed from colorless to yellow and then began to darken with liberation of heat and visible formation of gel-like material. After additional standing a slurry of deep-red, gel-like catalyst was formed. This run demonstrates the formation of a catalyst composition using a different organic fluorinating agent than was used in Example 1.

*Example 8*

The dried polymerization reactor was charged with 225 ml. anhydrous hexane, 25 ml. freshly distilled methylene chloride, and 50 ml. vinyl isobutyl ether which had been water-washed, dried and distilled over calcium hydride. The monomer solution was cooled to −40° C. and 1.5 ml. of the catalyst slurry from Example 7 added at a slow rate over an interval of one hour. The temperature was maintained at −40° C. up to −30° C. Polymerization proceeded at a rapid rate as polymer gel became visible in the reactor and this solution became viscous. After 70 minutes reaction time the catalyst was quenched with pyridine and the polymer precipitated with excess methanol and filtered. The product polymer was extracted two times with excess boiling methanol, followed by two extractions with hot acetone and then dried in a vacuum oven. The white polymer, 33.1 g., had a specific viscosity of 0.063 for a 0.1% solution in chloroform at 25° C., gave a crystalline X-ray diffraction pattern without prior orientation or stretching, and was further characterized by a high stereospecific content as determined by the insolubility of the material in methyl ethyl ketone and by infrared spectra.

*Example 9*

This run demonstrates the effectiveness of the catalyst prepared according to the procedure of Example 7, for the polymerization of vinyl methyl ethyl ether to high molecular weight stereospecific polymer. The reactor, as previously described, was charged with 120 ml. anhydrous hexane, 80 ml. methylene chloride which had been freshly distilled and, after cooling this solution to −20° C., 50 ml. vinyl methyl ether was added. Catalyst slurry from Example 7, 2 ml., was added in intervals over a 75 minute period at −20° C. The reaction mixture became thick and had a granular appearance. The polymerization reaction was continued for a total time of 4.25 hours and the catalyst was then quenched by the addition of 2 ml. pyridine and the entire reaction mixture poured into methanol. The reaction solids were extracted with excess acetone and then the combined methanol and acetone liquors were processed by evaporation to recover 26.2 g. of soluble polymer.

The acetone insoluble fraction was dried in a vacuum oven. The yield of stereospecific polymer obtained in this run was 6.3 g. of polymer having a specific viscosity of 0.222 obtained for a 0.1% solution in chloroform at 25° C.

*Example 10*

This example illustrates the preparation of an ethylaluminum fluoride catalyst by the reaction of ethylaluminum dichloride and vinylidene fluoride, $C_2H_2F_2$. A glass reactor was charged with 25 ml. of methylene chloride, 5 ml. of ethylaluminum dichloride, and 45 ml. dry hexane, and the solution cooled to −78° C. By means of a Dry-Ice condensing system 1 ml. of vinylidene fluoride was charged to the solution and then the external cooling bath removed to permit the solution to warm up to room temperature. After a reaction period of about 5 hours, gel formation was visible and the color of the solution had become reddish. The reactants were permitted to stand at room temperature for 48 hours, during which time the catalyst slurry had completely formed and the solution had become a deep red color. This catalyst slurry was adaptable to use of preferred sampling procedures by means of a hypodermic syringe.

*Example 11*

A 500 ml. polymerization reactor equipped with mechanical stirring device was charged with 225 ml. pure hexane which had been passed through a column packed with molecular sieves, 25 ml. freshly distilled methylene chloride, and 50 ml. vinyl isobutyl ether which had been washed with ice water, dried over calcium chloride and distilled from calcium hydride. The monomer solution was cooled to −40° C. and 1 ml. of catalyst slurry prepared according to Example 10 added. There was little evidence of polymerization until the temperature was permitted to climb to −25° C. and the reaction was continued for 2.25 hours at −25° C. to −20° C., then the catalyst was quenched by the addition of 2 ml. pyridine and the entire reaction mixture poured into excess methanol. The product polymer was extracted three times with hot methanol, filtered, and dried in the vacuum oven at room temperature to obtain 20.7 g. of solid polymer having a specific viscosity of 0.058 measured for a 0.1% solution in chloroform at 25° C. The product obtained in this run contained a significant quantity of isotactic polymer characterized by infrared spectra and solubility characteristics.

While the invention has been described with particular reference to preferred embodiments thereof, it will be appreciated that variations from details given herein can be effected without departing from the invention in its broadest aspects.

I claim:

1. The process of polymerizing a vinyl ether having the formula $CH_2=CHOR$, where R is selected from the group consisting of alkyl radicals of 1 to 14 carbon atoms, haloalkyl radicals of 1 to 10 carbon atoms containing 1 to 3 halogen atoms, wherein each halogen has an atomic weight of at least 35, and haloaryl radicals of 6 to 10 carbon atoms containing 1 to 5 halogen atoms wherein each halogen has an atomic weight of at least 35 to solid, high molecular weight polymer of stereospecific structure which comprises contacting said vinyl ether with a catalyst of the formula R′AlXF, wherein R′ is an alkyl radical of from 1 to 12 carbon atoms, and X is a halogen, said catalyst being prepared by the reaction of a fluorinating agent with an alkylaluminum dihalide wherein said halide is selected from the group consisting of chloride, bromide and iodide.

2. The process of claim 1 wherein said vinyl alkyl ether is vinyl methyl ether.

3. The process of claim 1 wherein said vinyl alkyl ether is vinyl isobutyl ether.

4. The process of claim 1 wherein said vinyl alkyl ether is vinyl tert. butyl ether.

5. The process of claim 1 wherein the polymerization reaction is conducted at a temperature between −40° C. and +50° C.

6. The process of claim 1 wherein the catalyst is an alkylaluminum difluoride.

7. The process of claim 1 wherein the catalyst is ethylaluminum difluoride.

8. The process of polymerizing a vinyl alkyl ether of the formula $CH_2=CHOR$, where R is an alkyl hydrocarbon radical of from 1 to 14 carbon atoms, to a polymer characterized by a stereospecific structure, which comprises contacting said vinyl alkyl ether with a catalyst having the formula R′AlXF, wherein R′ is an alkyl group of 1 to 12 carbon atoms, and X is a halogen, said catalyst being prepared by the reaction of an alkylaluminum dihalide, wherein said halide is selected from the group consisting of chloride, bromide and iodide, with an organic fluorinating agent.

References Cited by the Examiner

UNITED STATES PATENTS 3,133,906  5/1964  Natta et al. _____ 260—91.1

OTHER REFERENCES

Montecatini (Belgium), 579,812, published second half of December 1959, Derwent Belgium Patent Report, No. 60B, January 12, 1960.

Dall'Asta et al., Chim. e Ind. (Milan), 43, 999–1003 (1961).

Montecatini (Belgium), 603,883, September 18, 1961, Derwent Belgium Patent Report, No. 81B, PA2, issued November 24, 1961.

JOSEPH L. SCHOFER, *Primary Examiner.*

LEON J. BERCOVITZ, *Examiner.*